Dec. 14, 1965 W. H. PETERSON 3,223,049

SPLIT SLIDING SILL AND CUSHIONING ARRANGEMENT

Original Filed May 21, 1962 10 Sheets-Sheet 1

INVENTOR.
WILLIAM H. PETERSON
BY Wayne Morris Russell
His Att'y.

INVENTOR.
WILLIAM H. PETERSON
BY
Wayne Morris Russell
His Att'y.

SPLIT SLIDING SILL AND CUSHIONING ARRANGEMENT

Original Filed May 21, 1962

INVENTOR.
WILLIAM H. PETERSON
BY Wayne Morris Russell
His Att'y.

Dec. 14, 1965 W. H. PETERSON 3,223,049

SPLIT SLIDING SILL AND CUSHIONING ARRANGEMENT

Original Filed May 21, 1962 10 Sheets-Sheet 4

INVENTOR.
WILLIAM H. PETERSON
BY
Wayne Morris Russell
His Att'y.

SPLIT SLIDING SILL AND CUSHIONING ARRANGEMENT

Original Filed May 21, 1962 10 Sheets-Sheet 5

INVENTOR.

WILLIAM H. PETERSON

BY Wayne Morris Russell

His Att'y.

Dec. 14, 1965 W. H. PETERSON 3,223,049

SPLIT SLIDING SILL AND CUSHIONING ARRANGEMENT

Original Filed May 21, 1962 10 Sheets-Sheet 6

INVENTOR.

WILLIAM H. PETERSON

BY Wayne Morris Russell

His Att'y.

Dec. 14, 1965 W. H. PETERSON 3,223,049

SPLIT SLIDING SILL AND CUSHIONING ARRANGEMENT

Original Filed May 21, 1962 10 Sheets-Sheet 7

INVENTOR.
WILLIAM H. PETERSON
BY Wayne Morris Russell
HIS ATT'Y.

INVENTOR.
WILLIAM H. PETERSON
BY Wayne Morris Russell
His Att'y.

INVENTOR.
WILLIAM H. PETERSON
BY
Wayne Morris Russell
His Att'y.

SPLIT SLIDING SILL AND CUSHIONING ARRANGEMENT

Original Filed May 21, 1962 10 Sheets-Sheet 10

INVENTOR.
WILLIAM H. PETERSON
BY Wayne Morris Russell
His Att'y.

United States Patent Office 3,223,049

Patented Dec. 14, 1965

3,223,049

SPLIT SLIDING SILL AND CUSHIONING ARRANGEMENT

William H. Peterson, Homewood, Ill., assignor to Pullman Incorporated, Chicago, Ill., a corporation of Delaware Continuation of application Ser. No. 196,320, May 21, 1962. This application June 9, 1965, Ser. No. 469,024
4 Claims. (Cl. 105—392.5)

This is a continuation of United States patent application Serial No. 196,320 filed May 21, 1962, and now abandoned.

The present invention relates to railway vehicles of the cushion underframe type and, more particularly, to a new and novel sliding sill structure and cushioning arrangement for protecting the sliding sill structure and the lading carried by the car from damage.

It is an object of the present invention to provide a sliding sill for a railway vehicle of the cushion underframe type wherein a long travel cushioning device is operatively interposed between the vehicle and the sliding sill, and the sliding sill is formed of sections which, in response to buff and draft forces respectively, are relatively movable lengthwise to each other to extend and contract the overall sill length and wherein shock-absorbing means for relieving the stresses imparted through the sill length are disposed relative to the sections so as to be operative during the movement of the sections to cushion the sill itself against draft and buff impacts imparted through the length of the sliding sill.

It is a further object, taken in conjunction with the immediately foregoing object to provide a sliding sill with means for accommodating the long travel cushioning means so that the latter is operative to also cushion the sill against buff impacts applied through the couplers.

It is still a further object to provide a sliding sill for a cushion underframe vehicle wherein the sliding sill and the cushioning arangement disposed between the car body is constructed and arranged so as to obviate the necessity for draft gear normally associated with the couplers fixed to the end of the sliding sill.

It is another object to provide a sliding sill and a cushioning arrangement for a cushion underframe vehicle wherein the sliding sill includes a plurality of sections relatively movable lengthwise of each other and further includes a shock-absorbing means disposed between the relatively movable sections to independently absorb a portion of the shock of impact imparted through the length of the sill, wherein a long travel cushioning means of the type disclosed in my Patent 3,003,436, granted October 10, 1961, is operatively interposed between the sliding sill and the car body for providing lading protection in accordance with the teachings of that patent and wherein the latter cushioning means is disposed relative to the sill sections so as to be operative to cushion the sill against buff impacts imparted through the sliding sill.

It is still another object, taken in conjunction with the immediately foregoing object, to provide a long travel cushioning means of the type indicated having substantially constant force travel closure characteristics whereby the latter, during at least a portion of its cushion travel, is operative to cushion the sill against buff impact imparted through the sliding sill.

Further objects and features will hereinafter appear.

Figures 10, 15:
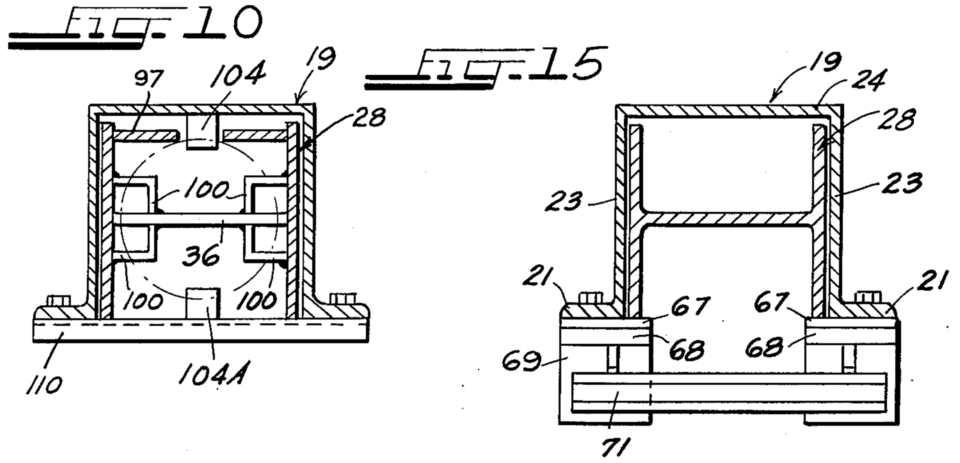
FIG. 10 is a cross-sectional view taken substantially along the lines 10—10 of FIG. 3.
Figures 12, 13, 14:
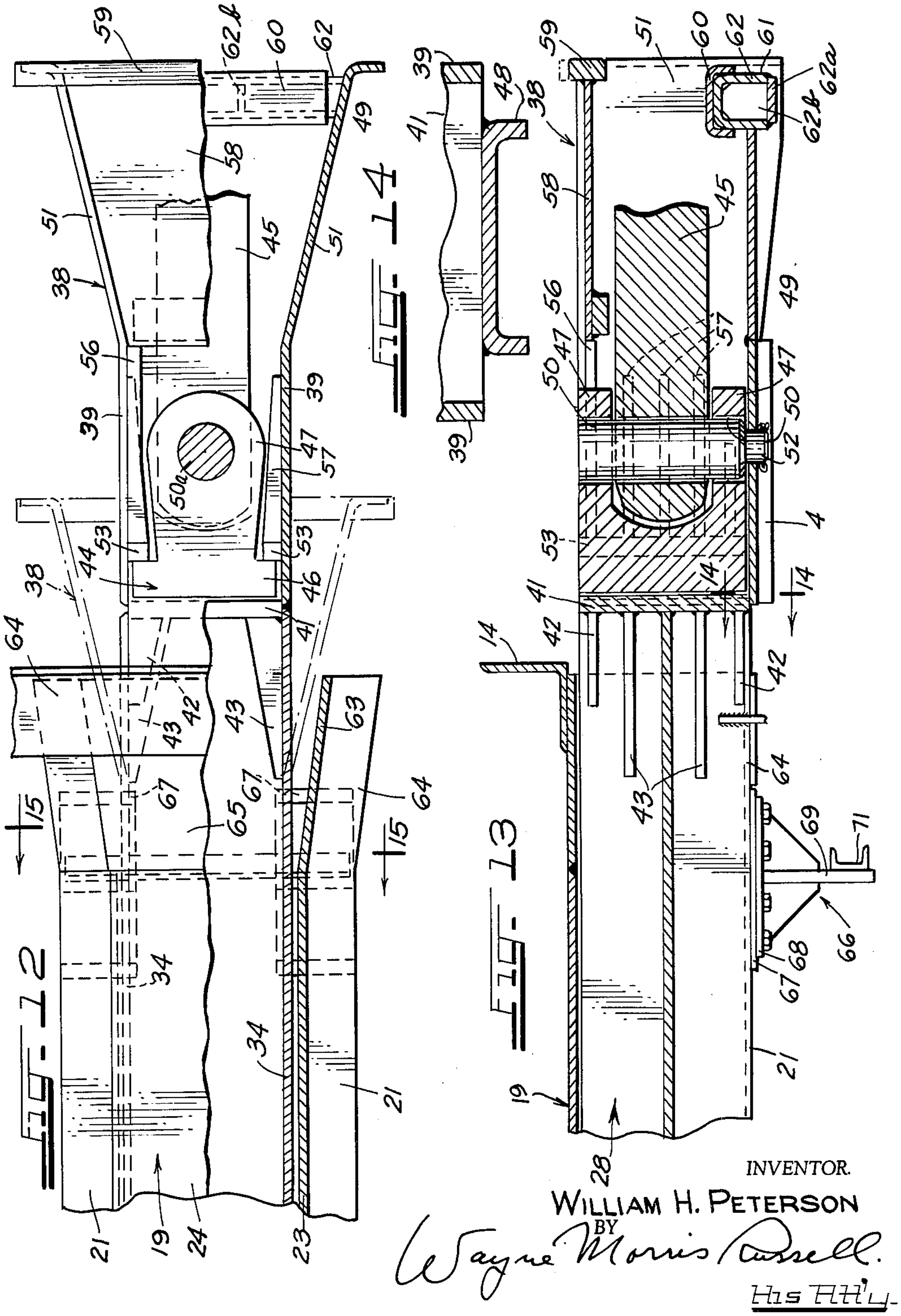
FIG. 12 is a fragmentary plan view, partly in section and with parts broken away, of an end portion of the underframe and showing, in particular, the coupler-attaching structure at the end of the sliding sill.
FIG. 13 is a longitudinal vertical sectional view taken substantially along the lines 13—13 of FIG. 12.
FIG. 14 is a cross-sectional view taken substantially along the lines 14—14 of FIG. 13.
Figures 18A, 18B, 19A, 19B:
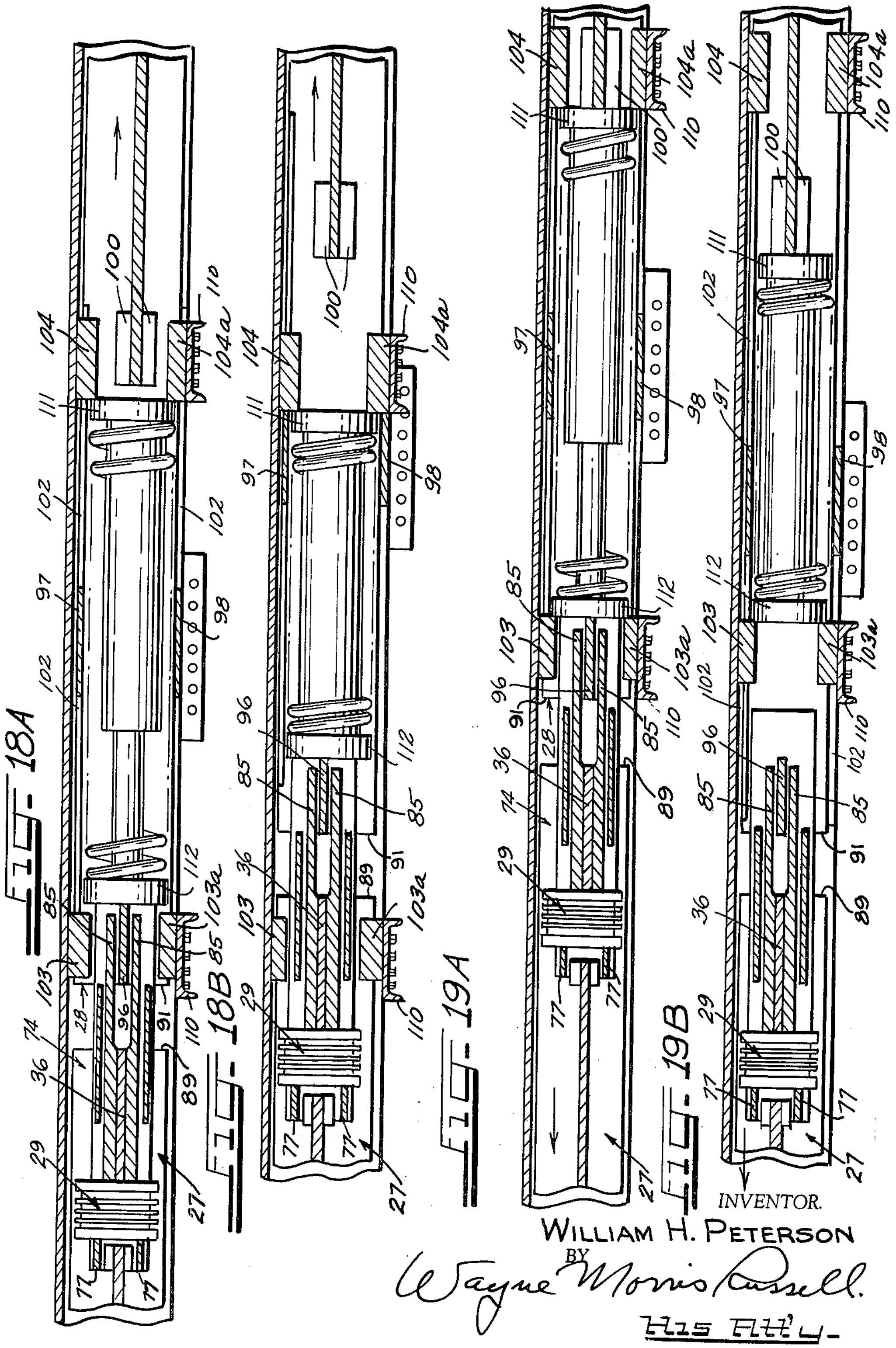
Figures 20, 21, 22:
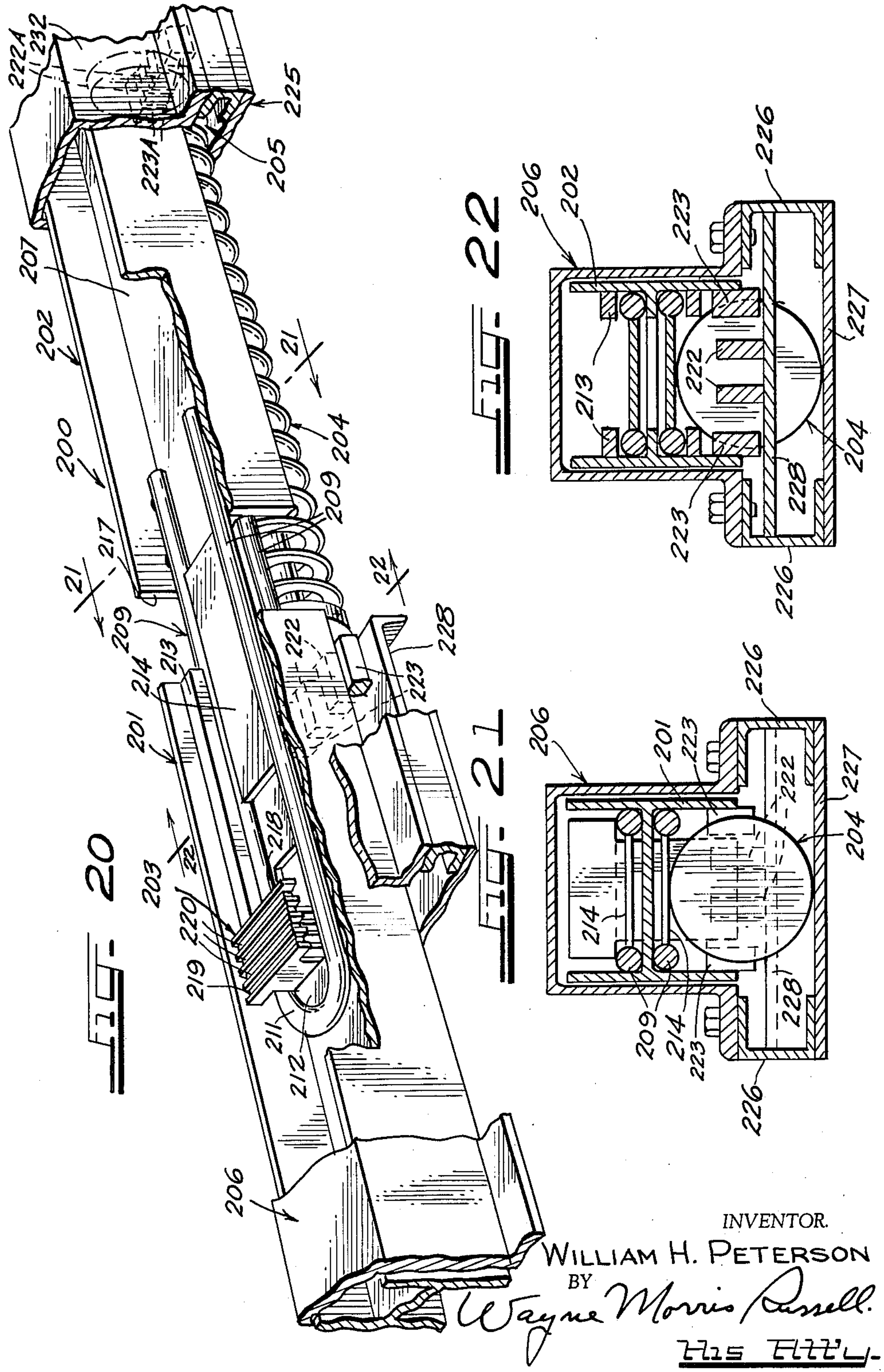

FIG. 15 ia s cross-sectional view taken substantially along the lines 15—15 of FIG. 12;

FIGS. 16A, 16B, 16C, and 16D are diagrammatic longitudinal cross-sectional views of the components of the center sill and the sliding sill and the long travel cushioning device showing the different relative positions thereof when subject to buff forces applied at the left end coupler;

FIGS. 17A, 17B, 17C, and 17D are similar to FIGS. 12A, 12B, 12C, and 12D, but showing the relative positions of the components in response to buff forces applied at the right end coupler;

FIGS. 18A and 18B are diagrammatic longitudinal cross-sectional views of the components of the center sill, the sliding sill, and the long travel cushioning device, showing the different relative positions thereof when subjected to draft forces applied at the right coupler;

FIGS. 19A and 19B are similar to FIGS. 18A and 18B, but showing the relative positions of the components when subjected to draft forces applied at the left coupler;

FIG. 20 is a perspective view of another embodiment incorporating the principles of the present invention;

FIG. 21 is a cross-sectional view taken substantiallly along the lines 21—21 of FIG. 20; and FIG. 22 is a cross-sectional view taken substantially along the lines 22—22 of FIG. 20.

Cushion underframe railway cars employ a coupler carrying sliding sill structure extending the length of the car and which is detached from the car structure supporting the lading thereon. The coupler carrying structure is operatively connected to the lading supporting structure by a cushioning arrangement which, upon impact in buff or draft to the couplers, is operative to transmit to the lading-supporting structure and the lading carried thereon, the longitudinal forces involved in the impact. When the principles of my Patent 3,003,436 are employed in constructing such an arrangement, the cushioning arrangement acts so as to prevent the impact stresses from damaging the lading-supporting car structure or its lading. For purposes of the description of the invention contained herein, the cushioning device which is employed between the lading-supporting structure and the sliding sill structure will hereinafter be indentified as a lading-protecting cushioning device.

The coupler carrying structure may be formed as a sliding sill or draft and buffing column suitably supported for movement lengthwise of the lading-supporting car structure. Heretofore, such sliding sills have been constructed as a continuous member extending the length of the car and carrying the couplers on the opposite ends thereof. Such continuous length sliding sill structures are subjected to severe impact stresses, especially those encountered in humping or switching of the cars. During such humping or switching, when the cushion underframe car is at the head end of a line of cars, upon impact at the free coupler, the force of buff impact, which may be at impact velocities of 10 m.p.h. or more, is transmitted through the length of the sliding sill to the coupler end attached to the line of cars. Because the sliding sill is abutted against the resistance of the line of cars at the coupler-attached end, coupler impacts against the sill ends cause stresses which may tend to buckle the sill.

Draft gear mounted in sill structures in association with couplers serve to reduce the magnitude of the energy transmitted through the sill. The draft gear employed heretofore have been generally of the rubber or friction gear types which are characterized by a force travel curve in which the force rapidly increases from a minimum to a maximum over its full length of travel. Because of the limited space requirements dictated by the sill and the coupler designs and by government regulations limiting the length of travel of the gears, the lengths of travel are normally in the range of about two to three inches in cushioning buff impacts involved and in the range of about one to two inches in cushioning draft impacts. Such limited travels, when employed with a rubber or friction type draft gear having the above-described force travel characteristics, are capable of providing only a limited cushioning action against impacts transmitted to the sill ends. In a typical draft gear, only about a maximum of 500,000 ft. lbs. of energy of impact in buff is capable of being absorbed.

Such a limited ability to cushion impacts, particularly in buff, may not be adequate to protect the sill inasmuch as under the conditions described above, during humping and switching at above impacts of 10 m.p.h. or more, as much as 1,300,000 ft. lbs. of energy may be transmitted through this sliding sill, such that the stresses created may be of sufficient magnitude to cause bending of the sill.

In accordance with the present invention, there is provided a sliding sill structure and a cushioning arrangement which serves to obviate the necessity of the draft gear at each of the coupler ends and which is constructed and arranged such that the lading protection cushioning means employed between the lading-supporting structure and the sliding sill is operative upon impact to the car in buff to provide a cushioning action for the sill.

Referring now to the drawings, the sliding sill and cushioning arrangement 10 is shown incorporated in an underframe 12 of a railway car of more or less standard construction. The railway car includes an underframe 12 of which the major portion extending from one end beyond the central portion thereof is shown, the other end portion being substantially identical to that shown. The underframe 12 may include side sills 13 and end sills 14 of which only one is shown, extending between and connected to the ends of the side sills 13 by gusset plates or other suitable means. Extending between the side sills 13 are cross-bearers 16, cross ties 17, and bolsters 18, of which only one is shown. A center sill 19, which may be of the conventional Z–26 type center sill, is an inverted channel having outwardly extending flanges 21 at its open end. The center sill, or stationary sill, is disposed centrally of the side sills 13 and parallel therewith, and provides a support for the cross bearers 16, cross ties 17, and bolsters 18.

Figure 5:
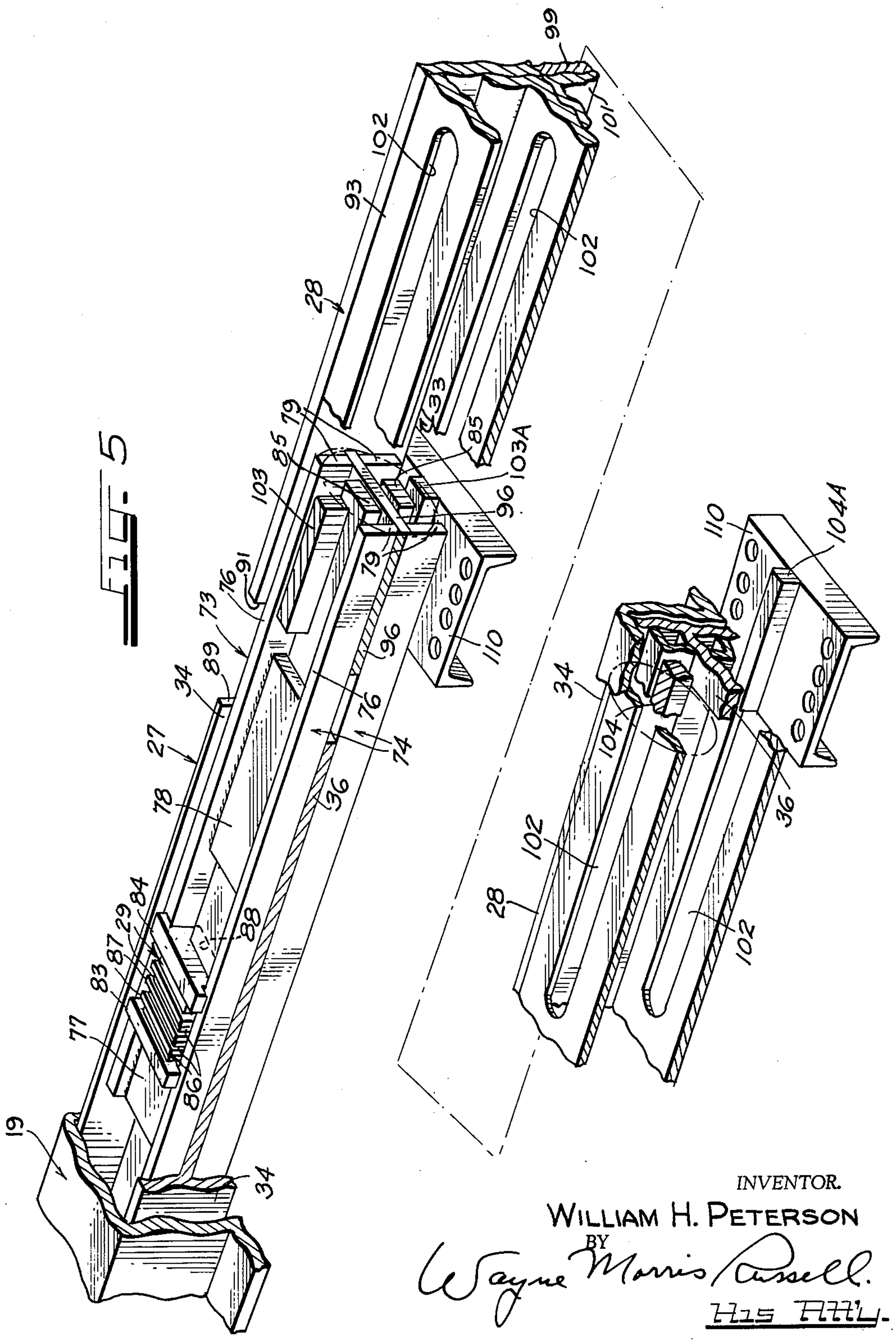
FIG. 5 is at perspective view of the underframe center sill portion of the railway car with the sliding sill of the present invention incorporated therein, with some of the parts broken away and in section, and showing in phantom a long travel cushioning device of the type indicated.
Figure 6:
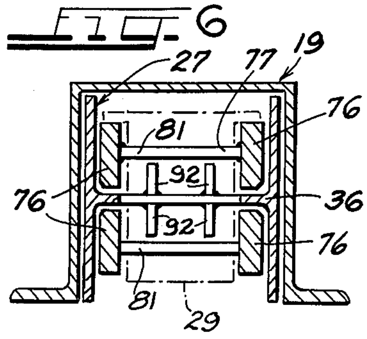
FIG. 6 is a cross-sectional view taken substantially along the lines 6—6 of FIG. 3.
Figure 7:
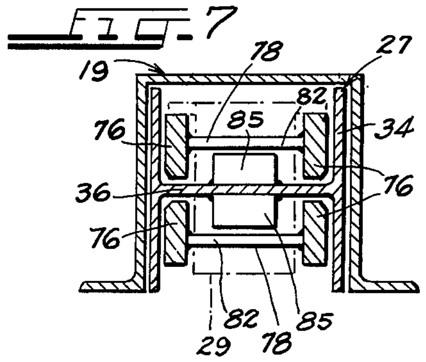
FIG. 7 is a cross-sectional view taken substantially along the lines 7—7 of FIG. 3.
Figure 8:
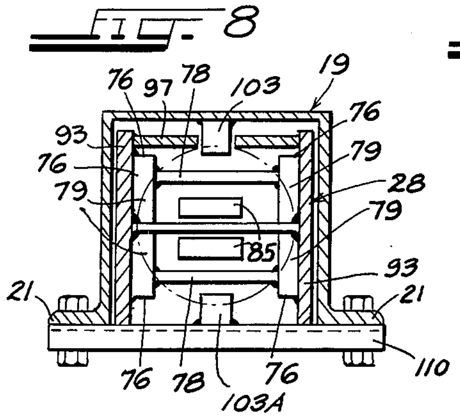
FIG. 8 is a cross-sectional view taken substantially along the lines 8—8 of FIG. 3.
Figure 9:
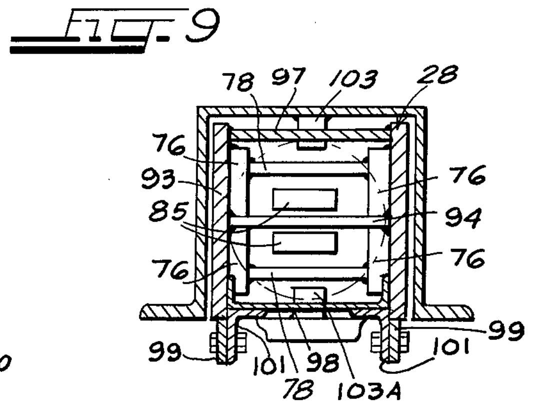
FIG. 9 is a cross-sectional view taken substantially along the lines 9—9 of FIG. 3.

Disposed within the hollow 22, defined by the spaced vertical flanges 23 and the top horizontal flange 24 of the stationary sill, is the sliding sill and cushioning arrangement 10 of the present invention which, as shown, comprises generally a sliding sill 26 formed from a pair of end-to-end telescoping sections 27 and 28. The sections 27 and 28 are normally spaced from each other in a neutral position, as shown, for example, in FIG. 5, and in response, or upon impact in buff or draft, are relatively movable to each other within the stationary sill 19 for limited movement in the direction of impact to a contracted position or an extended position. Upon reaching either limit position, i.e., the sill-extended or sill-contracted position, the sliding sill 26 is movable as a unit relatively to the stationary sill 19. The cushioning arrangement includes a stress-relieving cushioning means 29, which is disposed so as to be operative during the period in which the sliding sill sections are movable relatively to each other to provide a cushioning action on the sill against buff or draft forces acting at the couplers 31 mounted on the remote ends of the sections 27 and 28. The cushioning arrangement further includes a long travel cushioning device 32 of the type referred to above disposed in a cushion pocket 33 formed between the sliding sill 26 and the center sill 19. The cushioning device, or lading-protection cushioning device, is operative in accordance with the principles of said Patent 3,003,436 to protect the car body and the lading supported thereon.

The sliding sill and cushioning arrangement 10 of the present invention may be employed in existing car structure as well as new car structure. Such conventional existing car structure generally includes the standard Z–26 center sill 19 illustrated in the exemplary car. In this connection, it should be mentioned that the stationary center sill 19 illustrated is used for purposes of illustration and that different types of stationary or sill-supporting structures may be employed with the construction of the present invention.

The sliding sill sections 27 and 28 may each be formed of column-like beam members capable of withstanding the impact at the couplers 31 attached to the remote ends thereof. The columns may be of H-section including a pair of spaced vertical legs 34 interconnected intermediate the top and bottom ends by a horizontal web 36. The H-beam is sized such that the vertical legs 34 are spaced from the inner walls of the vertical flanges 22 of the stationary sill 19 to permit free movement of the sliding sill 26 within the stationary sill. In this connection, it is to be noted that in the event the invention is incorporated into an existing car, the conventional Z–26 center sill employed therein provides adequate space between the vertical flanges 22 to accommodate an H-beam of standard section. For supporting the sliding sill 26 within the hollow 22, there may be provided supporting plates suitably fastened to the horizontal flanges 21. While the sill section 28 may be formed solely from an H-beam member, in the preferred form shown, the sill section 28 is provided with a weldment providing a cushion pocket 33 for housing the cushioning device 32.

As shown, in particular in FIGS. 12 through 15, the remote ends of the sections 27 and 28 are each provided with a coupler housing for mounting the couplers 31 on the sliding sill 23. In view of the fact that the attachment and the coupler housings 38 are identical at each of the remote ends of the sections 27 and 28, only the attachment of the right coupler housing 38 will be hereinafter described. The coupler housing 38 includes a pair of transversely spaced vertical plates 39 flared outwardly at their outboard ends to accommodate the swing of the coupler 31. The other end portions of the plate 38 are fixed as by welding to a transversely extending tie block 41 fixed to the outboard end of the sill sections 27 and 28. Maintaining the tie block 41 braced are bracing members 42 and 43 welded to the opposing vertical flanges 34 of the sliding sill section 28 and to the tie block 41. The braces 42 and 43 are constructed of different lengths which are determined so as to be able to resist the stresses applied at the tie block. Disposed between the housing plates 39 adjacent to the tie block 41 is a coupler-support bracket 44 including a rectangular section 46 from the middle portion of which there depends two vertically spaced pivot lugs 47 receiving the coupler shank end 45 having axially aligned openings 50 through which the coupler pin 50*a* is adapted to be dropped. The coupler support bracket 44 is supported at its lower end by way of a longitudinally extending channel 48 fixed along one of its ends to the tie block 41 and along its other end to the bottom plate 49, which plate 49 is fastened along its sides by way of welding to the flared portion 51 of the side plates 39. The channel 48 is provided with an opening 52 which receives the reduced end of the coupler pin 50*a*. Maintaining the coupler-supporting bracket 44 fixed against longitudinal movement against the tie block 41 are facing plates 53 affixed to the inner walls of the side of the housing plates 39 so as to abut against a shoulder 54 of the rectangular portion 46. The facing plates 53 are suitably braced by bracing members 56 and 57. The upper bracing members 56 each extend to the bend line of the side plate 39 and are affixed along their ends to the cover plate 58. Fixed within recesses provided in the upper portion of the side plates 39 is the usual striker plate 59, which is also fixed to the top plate 58 extending transversely between the flared portions 51 of the side plates. It is to be observed that the top or cover plate 58 terminates at the bend line of the flared portions 51 so as to provide an open-top through which the coupler supporting bracket may be installed into the position shown. In this manner, the assembly of the coupler bracket 44 within the housing is facilitated.

Extending across the lower portion of the open end of the coupler housing 38 is a coupler carrier 61, including a cross piece 62 of inverted U-shaped section, which is attached along its ends to the side plates 38 and to the bottom plate 49. Overlying the bight of the cross piece 62 is a support channel 60 on which the coupler shank rests. Welded to the free ends of the cross piece 62 is a plate 62*a* and spaced transversely of the cross piece are suitable bracing plates 62*b*.

The end sill sections of the underframe are modified at each end to provide a bell-mouth opening for accommodating the flared end of the coupler housing 38 when the sliding sill moves the limit of its travel as determined by the length of the cushion travel employed. As shown, this is accomplished by terminating the stationary center sill 19 short of the end sill 14. Fixed to the ends of the vertical flanges 22 of the stationary sill 19 and to the outwardly depending horizontal flanges 21 are angle members having a vertical web 63 and a horizontal web 64. The vertical webs 63 are flared outwardly complementary to the flare of the coupler housing 38. Fixed, as by welding, to the upper ends of the flanges 63 is a cover plate 65 which is also secured by welding to the horizontal flange 24 of the stationary sill. A tie assembly 66 is employed at the juncture of the stationary sill with the flared attachment. The tie assembly 66 includes guide plates 67 affixed to the horizontal flanges 64 and 21 on both sides of the stationary sill. The guide plates 67 project inwardly so as to provide support for the vertical flanges 34 of the sliding sill thereon. The guide plates 67 are suitably reinforced by a reinforcing plate 68 from which there depends a plate 69 across the lower end of which there is secured, as by welding, a transversely extending channel 71 connecting the vertical flanges 69 on either side of the stationary sill. The channel 71 is spaced below the stationary sill so as to provide adequate clearance for trainline equipment (not shown).

Limiting the movement of the sill sections towards and away from each other from the normal or neutral position and coacting with the stress-relieving means 29 and the lading protecting cushion 32 are sill interconnecting means 73. The interconnecting means 73 includes a pair of yokes 74, each including a pair of transversely spaced legs 76, a bight plate 77 across one end of the legs, and a buffer plate 78 disposed between the ends of the legs so as to provide an enclosure encompassing the stress relieving cushion means 29. The yoke legs 76 may be formed of bar stock of substantially rectangular section. The free ends of the legs are fixed to sill section 28 for movement therewith, as by welding, to the inner walls of the cushion pocket 39, with the terminal ends 79 aligned with the left end of the pocket 33. The portion of the legs 76 extending into the other sill section 27 is spaced from the vertical flanges 34 and horizontal web 36 to permit free relative movement of the sill section 27 to the legs 76. The opposing edges 81 and 82 respectively of the bight and buffer plates 77 and 78 are longitudinally spaced from each other so that the stress relieving cushioning means is rendered operative during at least the latter increment of relative movement of the sill sections 27 and 28 from their spaced neutral positions to their contracted or buff positions, as shown in FIGS. 16A and 16B and 16C and FIGS. 17A, 17B, and 17C, as more fully to be explained hereinafter.

Fixed on the upper and lower sides of the web 36 of the sill section 27 are key members 85 which extend into the sill section 28 in spaced relationship with the horizontal web thereof. As shown, the key members 85 may be in the form of a bar of rectangular section. The keys 85 are of such a length that in the neutral position of the sill sections 27 and 28 the terminal end fixed on the sill section 27 abuts the inboard end of the stress relieving cushioning device 29 and the terminal end extending into sill section 28 abuts the inboard follower plate of the lading protection cushioning means. The keys are dimensioned such that clearance is provided between the yoke legs 76 and buffer plates 78. The adjacent sides of the bars 85 are formed with an undercut to clear the horizontal web of the section 28.

Preferably, the sliding sill stress-relieving means 29 which is operative to relieve the shock of impact imparted through the length of the sliding sill, as more fully to be explained hereinafter, is a resilient cushion unit. The cushion unit 29 shown includes an outboard follower plate 83 and inboard follower plate 84 between which there is disposed a plurality of resilient pads 86 separated by metallic discs 87. The resilient cushioning unit is disposed in a cut-out 88 formed in the horizontal web 36 of sill section 27. The cut-out 88 is sized such as to slightly compress the unit 29 so that the resiliency thereof is effective to maintain the unit in the cut-out 88. In the neutral position of the sill sections 27 and 28, as shown, for example, in FIG. 5, the yoke bight plate 77 contacts the follower plate 83 and the yoke buffer plate 78 is spaced from the follower plate 84 a lesser distance than the spacing between the adjacent abuttable ends 89 and 91 of the sill sections 27 and 28 respectively, so that upon contraction of the sill sections 27 and 28 toward each other to an abutting position, the buffer plate 78 contacts the follower plate 84 and compresses the cushioning unit 29 within the cut-out 88 against braces 92 fixed to the sill web 36 before the ends 89 and 91 abut.

The cushion pocket 33 fixed to the sill section 28 includes a pair of transversely spaced plates 93 connected intermediate their inboard ends by way of a horizontal plate 94 which is in substantially the same plane as the horizontal web 36 of the H-section of the sliding sill 28. The end or edge 96 of the plate 93 is spaced from the free end of web 36 of the section 28 so as to accommodate the fully expanded length of the cushioning device 32. Preferably, the plates 93 and 94 forming the cushion pocket are of heavier section than the H-beam section so as to provide sufficient strength and rigidity to the cushion pocket structure. Stop members 100 in the form of angles are fixed to the web 36 at the outboard end of the cushion pocket 33 and arranged to abut the cushion device 32.

Enclosing the cushion pocket 33 are top and bottom cover plates 97 and 98, respectively. The top cover plate 97 is in the form of a horizontally disposed plate fixedly secured across the upper ends of the vertical webs 93. Advantageously, the lower cover plate 98 may be detachably secured so as to permit ready access to the cushioning device 32 for removal and servicing of the latter, if necessary. As shown, the lower cover plate 98 is in the form of a channel having upwardly depending flanges disposed inwardly of the vertical webs 93. Fixed to the underside of the channel 98 and located complementary to a plate 99 depending downwardly from each of the flanges 93 is an angle member 101 having openings complementary to the openings provided in the depending member 99 so as to permit securement of the bottom cover plate as by bolts. The top and bottom plates or covers 97 and 98 are each provided at their ends with open-ended slots 102 in which stationary key members 103 and 103A and 104 and 104A carried by the stationary sill 19 are adapted to project.

As shown, the key members 103 and 104 are fixed to the underside of the horizontal web of the stationary sill such that the faces thereof are in alignment with the respective ends of the cushion pocket. The key members 103A and 104A are secured across the open end of the stationary sill by way of channels 110 which also serve to support the sliding sill 23 within the stationary sill.

The cushioning device 32 is of the type referred to above which, upon impact at the couplers, closes as to provide lading protection, in accordance with the principles of my Patent 3,003,436 for a full range of impacts up to collision impacts occurring at 12 m.p.h. and above. Preferably, the cushioning device 32 is thus characterized by a cushion closure travel in the range of from about 20 to about 40 inches, and having the closure characteristics described in said patent, whereby damaging forces on the lading are avoided.

One such type of cushioning device having the desired characteristics and found to be particularly suitable in practicing the present invention is a hydraulic cushioning means having a substantially constant force-travel closure characteristic one form of which is shown in said patent. In the embodiment herein shown, particularly in FIG. 11, the hydraulic cushioning means 32 comprises generally a telescoping unit comprising a tubular cylinder 106 in which a piston head 107 is reciprocably mounted, a tubular piston rod 108 fixed to the piston head 107, and an invaginating tubular member or boot 109 connected between the tubular cylinder 106 and the tubular piston rod 108, and helical compression springs 110 extending between closure or follower members 111 and 112 fixed to the tubular cylinder 106 and tubular piston rod 108, respectively. The closure member 111 carries a metering pin 113 which is reciprocably received within the bore 114 of the tubular piston rod via an orifice 115 provided in the piston head 107.

The device 32 is charged with hydraulic fluid to completely fill the space defined by the tubular cylinder 106, the tubular piston rod 108, and the invaginating boot 109. When the device 32 is in use, as when it is disposed in the cushion pocket 33 of the sliding sill 23, the normal positioning of the device components is that shown in FIG. 16A, the device being mounted between the cushion keys 103 and 103A and 104 and 104A attached to the underframe or stationary center sill 19 and abutting on one side the horizontal web plates 96, the ends of bars 85, and the ends 79 of the yoke bars 76 and abutting on its other side the horizontal web 36 of the sill section 28 and angle stops 97. When the cushioned underframe receives a shock in either buff or draft, either the tubular cylinder 106 will commence movement to the left or the tubular piston rod 108 and piston head 107 will commence movement to the right, or possibly both movements may occur. In any event, as the device retracts under the force being cushioned, the metering pin 113 displaces hydraulic liquid contained within the bore 114 of the tubular piston rod 108 and the piston head 107 causes a hydraulic liquid flow through orifice 115 past the metering pin 113 and assumes the position shown in FIG. 11. The metering pin shown is provided with fluted grooves 116 which are formed to impart a substantially constant force-travel closure characteristic as the cushion contracts under the shock imposed upon it. In other words, the arrangement is such that for every unit of travel the cushioning device provides a substantially constant cushion resisting force. For a more detailed description of the manner in which the metering pin and the flutes therein are formed so as to provide constant force-travel closure characteristics and the manner in which the unit cushions impacts, reference is made to patent application Serial No. 146,769 assigned to the assignee of the present invention and the aforementioned patent.

Briefly, upon retraction or contraction of the device, the fluid on the side of the piston head 107 adjacent the closure plate 111 offers resistance against the impact force as determined by the rate of flow of the fluid through the orifice 115 and the fluted metering pin 113. Because of the construction of the flutes 116, the resisting force is substantially constant for each increment of travel of the piston head 107 within the cylinder 106. The kinetic energy involved in the impact is dissipated in part in the form of heat by way of the flow of the fluid past the metering pin into the chamber defined on the side of the cylinder 106 containing the invaginating tube 109.

The travel of the cushion is arranged such as to impart to the cushioning device the ability to transmit to the lading on the car substantially that energy required to fulfill the Law of Conservation of Momentum as it relates to lading protection for railway vehicles. In other words, the cushioning device, when employed in a car body, dissipates a sufficient amount of the energy of impact (other than that portion of the energy stored in the spring) so that the residual energy of impact or a large part of it which is transmitted to the lading provides lading accelerations (either negative or positive) which are less than those creating destructive forces on the lading, as more fully described in the aforementioned U.S. Patent 3,003,436. It has been discovered by me, as brought out in said patent that under present typical existing conditions encountered in the make-up of trains, a cushion travel in the range of between about 20 to about 40 inches is capable of achieving the desired lading protection, and that the optimum results are obtained at about 30 inches of travel. Accordingly the above described type of cushion is preferably constructed to provide 30″ of travel in either direction from its neutral position.

The operation of the device as it operates in connection with the car will hereinafter be initially described as it occurs during the switching operation in the classification yards. During such switching, oftentimes the coupling speeds may in some instances amount to 12 m.p.h. or more. Such excessive coupling speeds, for example at impact speeds of 10 m.p.h., may create coupler forces of approximately 1,000,000 lbs. as measured in numerous impact tests made by applicant's assignee on cars equipped with standard draft gears. A force of this magnitude creates a considerable stress in the sliding sill 26, especially when one end of the sliding sill is attached to a stationary line of cars, which cars are the substantial equivalent of a solid abutment wall.

Figures 16A, 16B, 16C, 16D:
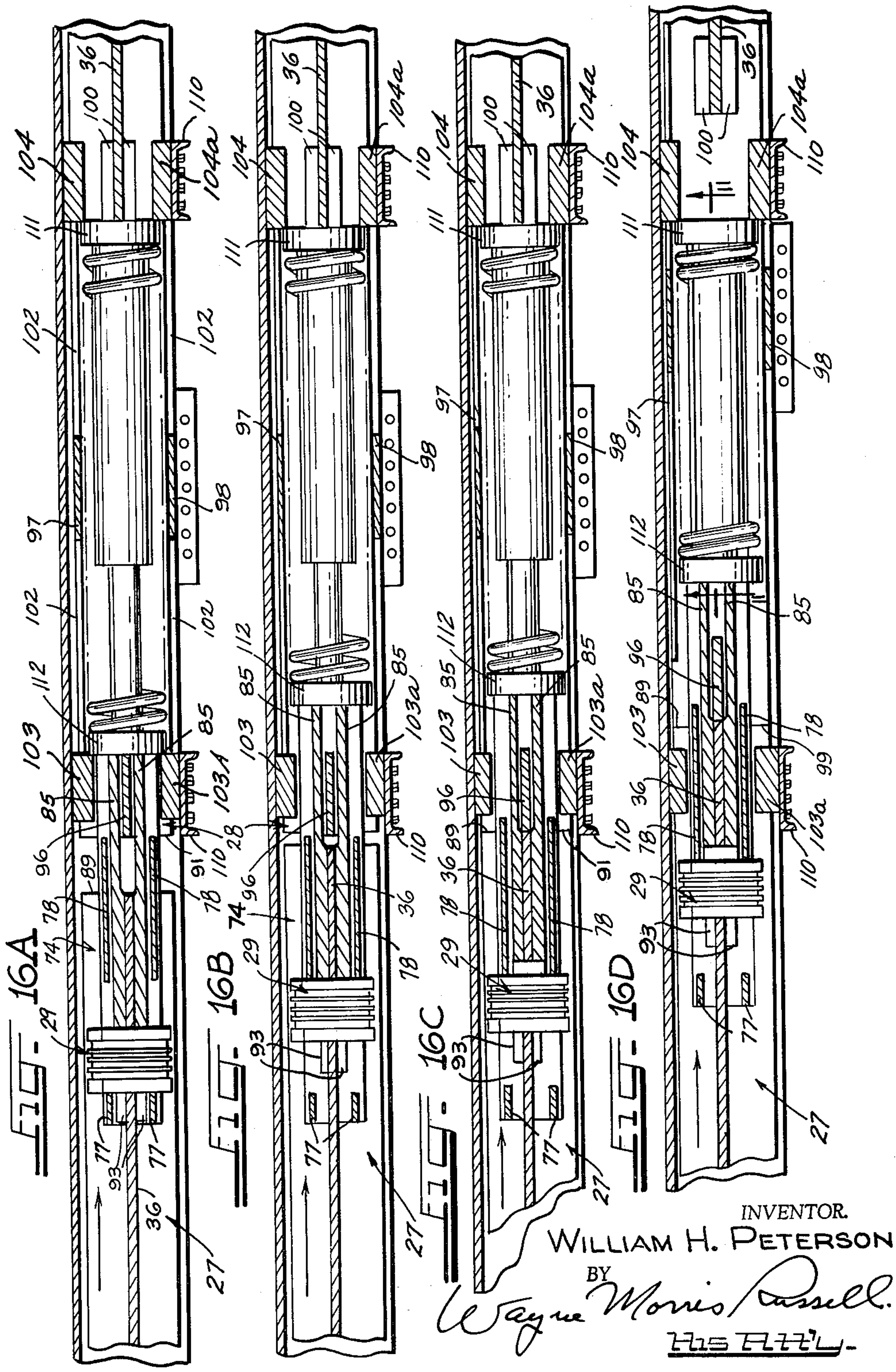

Assuming a sharp and abrupt buff force at the left end of the sliding sill 26, as illustrated in FIGS. 16A, 16B, and 16C, and assuming further that the spacing between the extended position or neutral position shown in FIG.

16A and the contracted sill position is approximately 10″ before the adjacent ends of the sill sections 27 and 28 abut and assuming that the buff plate 77 on the yokes 74 movable with the sill section 28 is located so as to contact the follower plate 84 after 8″ of travel, and that the cushion travel of the stress relieving means 29 is approximately 2″ and that the total travel of the high-capacity cushioning device is approximately 30″, upon initial impact of the buff coupler force, the section 27 moves to the right relatively to the section 28, which is connected by way of the coupler 31 to the stationary line of cars, and which remains substantially stationary within the center stationary sill 19. During such movement, the car body stops 103 and 103A and 104 and 104A mounted on the stationary center sill 19 also remain substantially stationary or fixed. However, the key bars 85 fixed for movement with the section 27 and contacting the follow plate 112 of the high capacity cushioning device 32 is operative to displace the piston head 107 within the cylinder 106 so that the device 32 is operative to provide a resisting force as heretofore described in connection with the operation of the cushioning device and thereby provide the cushioning action indicated. During the movement to the right, the follower plate 84 of the resilient cushioning device strikes the limiting edge 82 of the buffer plate 78 at approximately 2″ prior to the time that the sill ends 89 and 91 abut so that further movement results in compression of the cushioning member 29 (FIG. 16C) which creates an additional resisting force so as to absorb further energy in addition to that absorbed by the long travel cushioning device 32. Thus the resilient or rubber cushioning device 29 acts conjointly with the long travel cushioning device 32 to further relieve the stresses transmitted through the sliding sill 26 between the coupler ends thereof.

After the stress relieving cushioning device 29 has been completely compressed such that the ends of sill sections 27 and 28 are in face-to-face contact, the sliding sill may, in the event that cars attached to the right coupler are rendered movable under the force of impact at the left coupler, move as a unit for the total or an increment of the remainder of the travel of the cushioning device so that the desired cushioning effect is obtained on the lading as shown in FIG. 16D. It is to be observed that the follower plate 111 of the cushion 32 remains abutting against the stops or key 104 and 104A fixed to the stationary sill such that the key bars 85 movable with the now unitary sliding sill 23 are operative to compress the cushioning devices 32 thereagainst. Upon dissipation of the energy by the cushioning device, the spring 110 is operative to return the sliding sill sections 27 and 28 to the neutral position shown in FIG. 16A.

With the above arrangement under the conditions set forth, particularly advantageous results are obtained. By employing the lading protection cushioning means 32 having substantially constant force travel closure characteristics in the exemplary 10″ spacing of the sill sections, the lading protection cushion device 32 is operative to provide an effective cushioning protection for the sill against the action of the coupler force before the sill sections abut. Moreover, during the latter increment of the 10″ travel, the stress relieving cushioning means 29 is operative to absorb energy to the full extent of its absorbing capacity during its travel of approximately 2″. In this manner, both the cushioning device 32 and the cushioning member 29 are operative to provide an energy absorbing capacity or resisting force additively against the force of impact applied at the coupler such that the impact speed upon abutment of the sill sections is substantially less than the initial impact speed. Accordingly, the impact energy transmitted through the length of the sill when the sill sections 27 and 28 are in abutting relation is materially reduced so that the stresses imparted through the length of the sill 26 are correspondingly reduced when the car is subjected to buff impact during humping and switching.

Figures 17A, 17B, 17C, 17D:
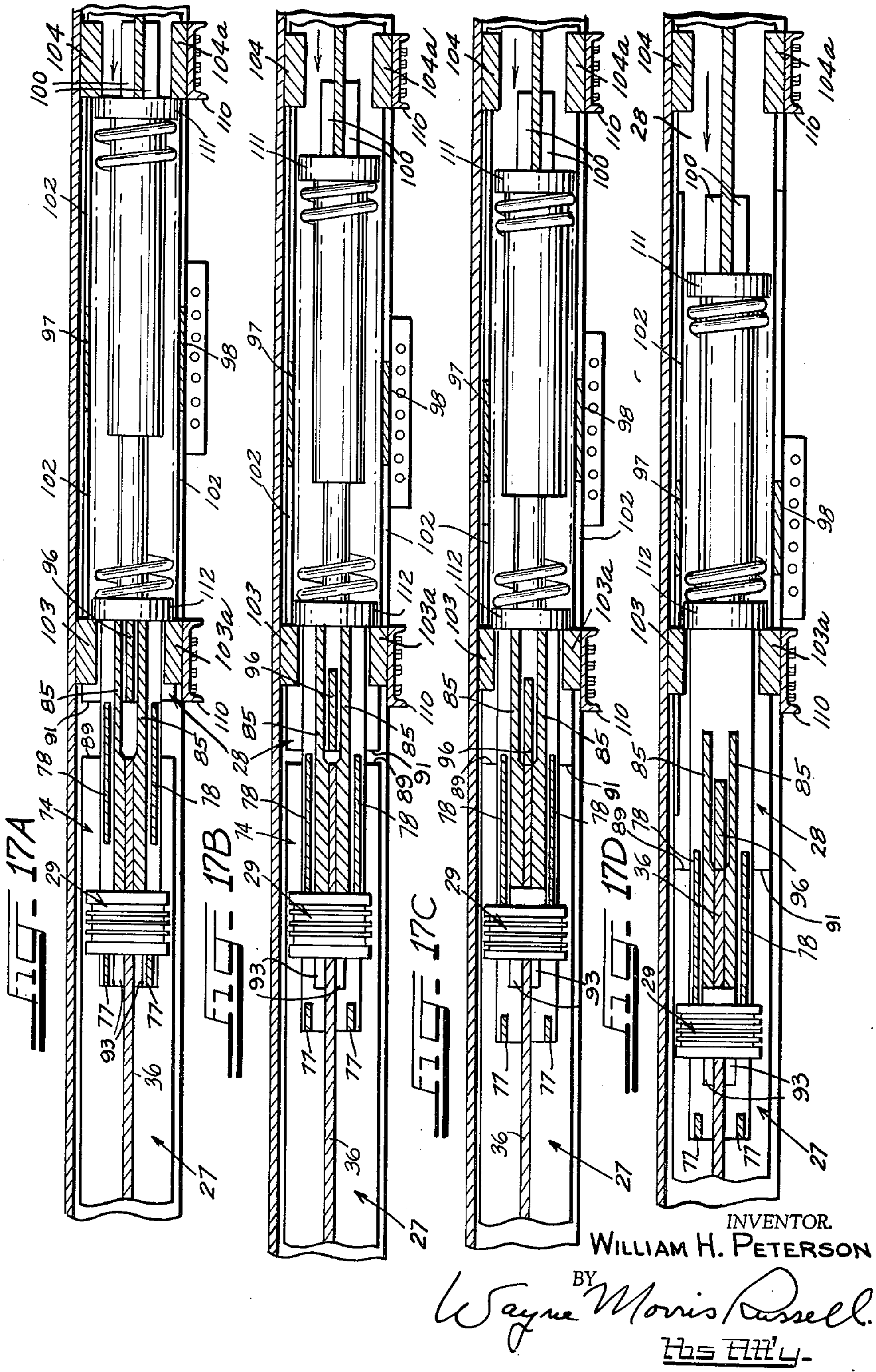

Referring now to FIGS. 17A, 17B, 17C and 17D, there is illustrated diagrammatically the relative positions assumed by the components when a buff impact is applied at the right coupler. Assuming the same facts and conditions set forth in connection with FIGS. 16A, 16B, 16C and 16D, initially, as shown in FIG. 17B the sill section 28 moves relatively to the sill section 27 which remains substantially stationary. The yoke members 74 fixed for movement with the sill section 28 move simultaneously and the buffer plate 78 carried thereon strikes the stress relieving cushioning follower plate 84 after about 8 inches of travel so as to compress the cushion 29 against the sill section horizontal web 36 and the braces 92 for its full length of travel, whereupon the section ends 89 and 91 abut as shown in FIG. 17C. At the same time, the lading protection cushioning device 32 is compressed between the stationary sill keys 103 and 103A and the key bars 85 fixed to the sill substantially stationary section 27. In this manner, as upon application of a buff force at the left end of the sill, both the lading cushioning device 32 and the stress-relieving cushioning means 29 are employed to absorb a portion of the energy of impact imparted at the right coupler during the distance in which sill sections are relatively movable to each other so as to reduce the energy transmitted through the length of the sill between the coupler ends thereof.

Further movement of the sliding sill 23 results in the moving of the two sections 27 and 28 in unison so that the horizontal web 36 and stops on the sill section 28 are operative to compress the cushion pocket against the stationary sill keys 103 and 103A and in this manner to provide the necessary car body and lading protection. Upon dissipation of the impact energy, the spring 110 is operative to return the components to their neutral position shown in FIG. 17A.

Referring now to FIGS. 18A and 18B, there is illustrated the relative positions of the components in response to a draft force applied at the right coupler carried by the sill section 28. Assuming the conditions heretofore set forth, namely, a normal 10-inch spacing between the sill section ends 89 and 91, a 30-inch lading cushion travel, and a 2-inch travel of the stress-relieving device 29, upon application of a sharp and abrupt draft impact force at the right coupler when the car is at the head end of a line of cars, the sill section 28 moves to the right and away from the sill section 27 which remains substantially stationary because of the force exerted by the line of cars attached to the opposite end coupler. As shown in FIG. 18A, this causes the bight plate 77 of the yoke 74 fixed for movement with the sill section 28 to compress the stress relieving device 29 for its full length of travel or an increment thereof depending on the magnitude of the draft force applied. In this manner, the stress-relieving cushioning means 29 is operative to absorb the energy of impact imparted through the length of the sliding sill 23 between the couplers 31. Should the draft force applied be of a magnitude causing movement of the line of cars attached to the left end of the sliding sill, the sections 27 and 28 move in unison to the right, as shown in FIG. 14B. The lading cushion 32 is compressed within the cushion pocket 33 against the stationary keys 104 and 104A fixed to the stationary sill 19. It is apparent, therefore, that the stress-relieving cushioning means is operative to reduce the energy transmitted through the length of the sill and that the lading cushioning device 32 is operative to control that magnitude of the energy transmitted to the car body and the lading supported thereon.

FIGS. 19A and 19B illustrate the relationship of the components upon application of a draft force to the left end of the sliding sill. When thus applied, the sill section 27 moves to the right and the sill section 28 remains stationary, being held by the line of cars attached thereto.

'he bight plates 77 of the yokes 74 fixed to the stationary ill section abutting the follower plate 83 are operative to ompress the stress relieving cushioning means 29, as hown in FIG. 19A and in this manner the latter is opera- ive to absorb a portion of the draft impact transmitted hrough the length of the sliding sill 26. As in the em- odiment described above, if the magnitude of the force ; such that the line of cars attached to the right end of he sill 23 is moved, the sill sections 27 and 28 move in nison so that the lading protection cushioning device ; compressed against the stationary sill keys 103 and 030, as shown in FIG. 19B.

Referring now to FIGS. 20, 21, and 22, there is illus- rated another embodiment of the present invention, in- luding a sliding sill 200 having sill sections 201 and 202, sill stress relieving cushioning device 203, and a lading rotection cushioning means 204 disposed in a cushion ocket 205.

The sliding sill 200 is slidably supported in the stationary enter sill 206 of the car and the sections 201 and 202 nay each be formed of an H-beam member having cou- lers attached to the remote ends thereof similarly to the mbodiment illustrated in FIGS. 1 to 19 in a bell-mouth pening formed at the ends of each section.

Fixed to the top and underside of the horizontal web 07 of the section 202, as by welding, so as to be movable herewith are legs 208 of yokes 209. The bight 211 of he yokes 209 extends into the sill section 201 and en- ircles the stress-relieving cushioning device 203. Fixed cross each of the bights is a plate 212 which engages the outboard end of the cushioning device 203 in the neutral osition of the still sections. For guiding the yokes 209 or sliding movement on the sill section 201, there may e provided guide plates 213. Fixed across the legs 208 s a buffer plate 214, of which the outboard edge is spaced rom the inboard end of the stress-relieving cushion means n the neutral position a distance less than the spacing etween the abuttable ends 216 and 217 of the sill sections 01 and 202 so as to be capable of compressing the ushion device 203 for its full length of travel before he ends 216 and 217 abut, as more fully to be explained ereinafter.

The stress-relieving device 203 is preferably a resilient ushion type, including follower plates 218 and 219 be- ween which there are disposed rubber pads 220 separated y metallic discs. The device 203 is disposed in a cut-out ormed in the horizontal web 207. The device 203 will ill the cut-out, but in FIG. 20 a middle portion of the levice is not shown, so as to better illustrate the cut-out.

The cushion pocket 205 is formed in the section 201 on he underside of the horizontal web 207 and the end limits re defined by sill key members 222 fixed to the sill sec- ion 201 and sill key members 223 fixed to the sill section 02. In the normal neutral position shown, the sill key nembers 223 and 222 abut the opposite ends of the lading rotection cushion means 204.

Fixed to the underside of the horizontal flanges 224 of the stationary center sill 206 is a bottom plate assem- bly 225 for supporting the cushion device 204 and in- cludes a pair of spaced channels 226 across the bottom of which there is fixed, as by welding, a bottom plate 227. Secured between the channels adjacent each end of the cushion pocket are inverted channels 228 on the horizon- al web of which there is secured stationary key members 222A and 223A spaced to be aligned at the faces bearing against the opposite ends of the cushioning device 204 with the bearing faces of the sill keys 222 and 223, re- spectively.

Figure 1:
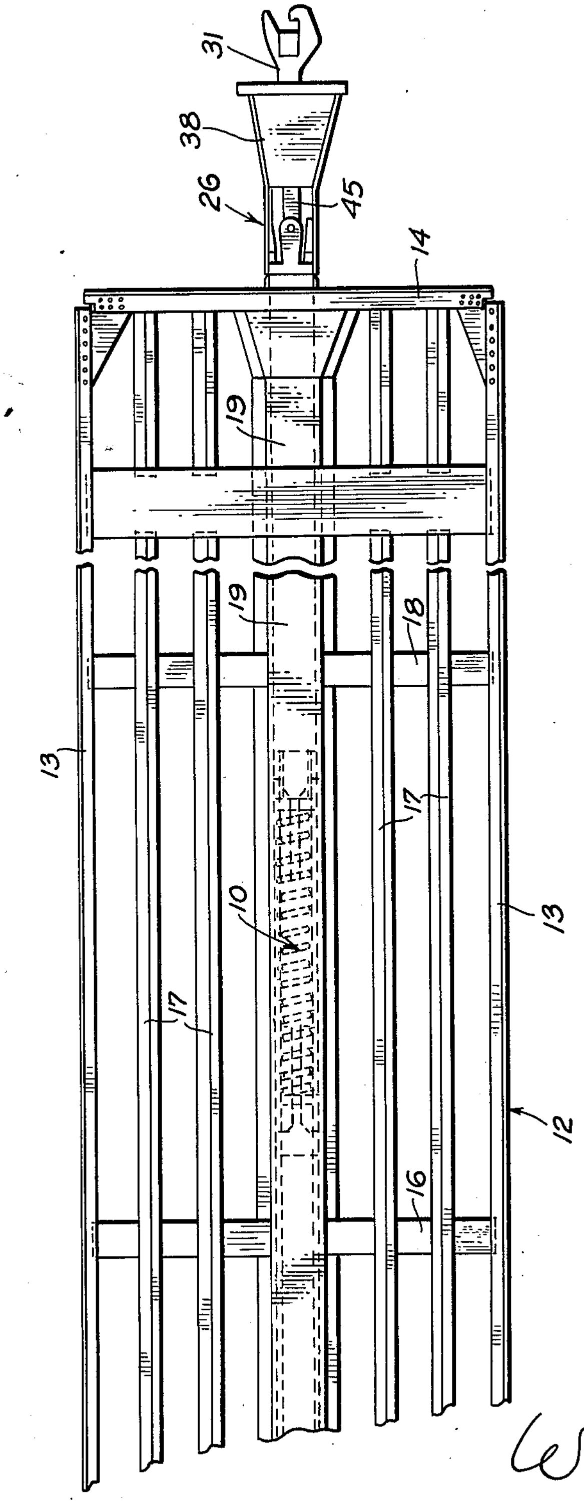
FIG. 1 is a fragmentary plan view of a railway car embodying the structure of the present invention.
Figure 2:
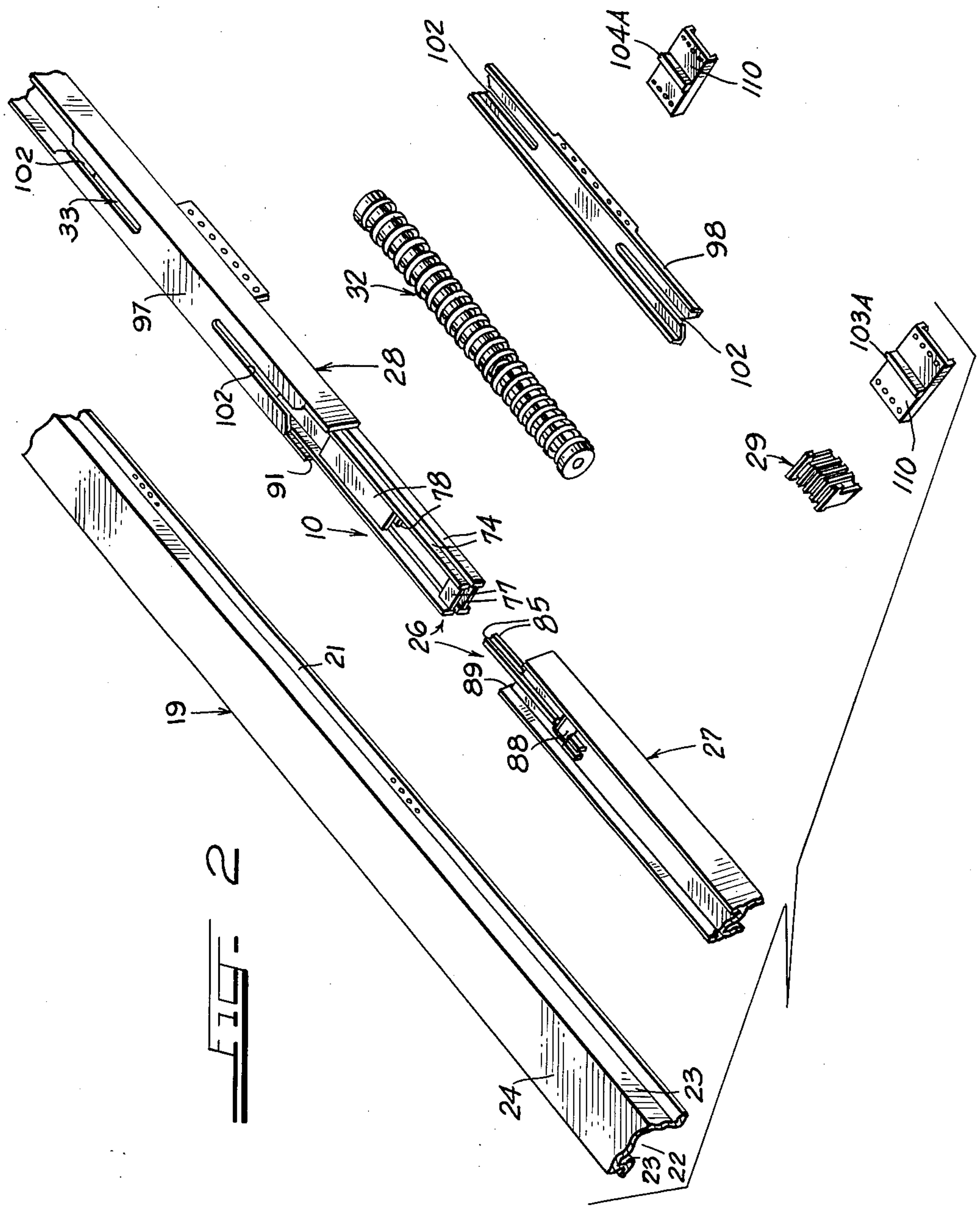
FIG. 2 is an exploded view of the sliding sill structure of the present invention shown in relationship with the stationary sill of a railway car.
Figure 3:
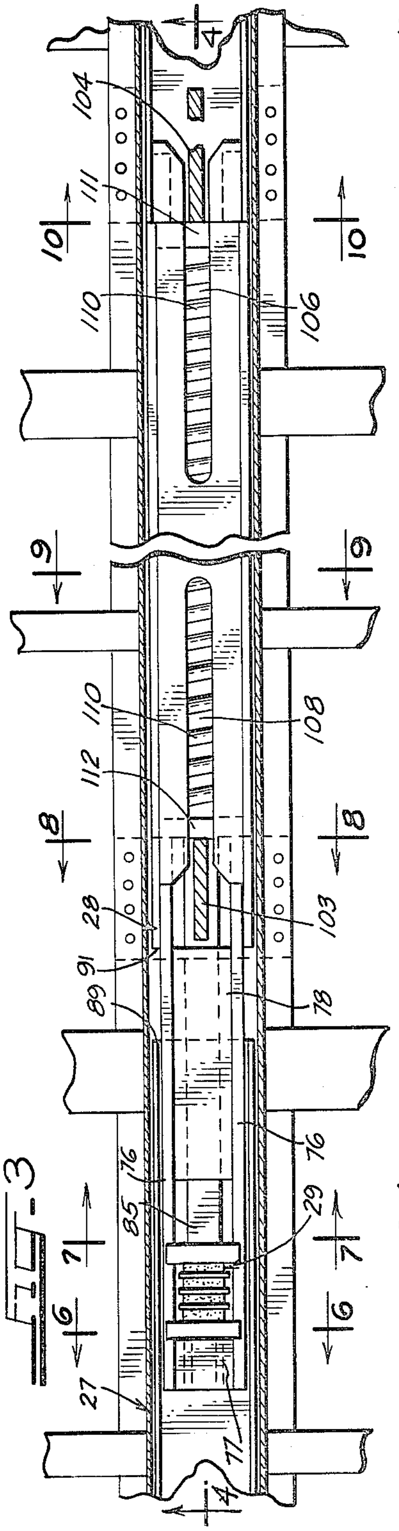
FIG. 3 is an enlarged fragmentary plan view of the center sill portion of the underframe of a railway car partly in section to show underlying details of the structure of the sliding sill.
Figure 4:
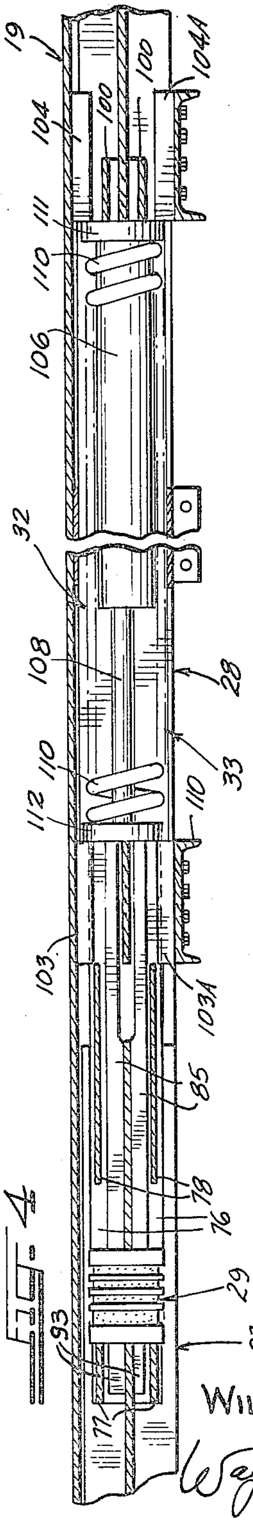
FIG. 4 is a fragmentary elevational view of the center sill portion of the underframe of the railway car partly in section and with some of the parts broken away to show underlying details of structure.
Figure 11:
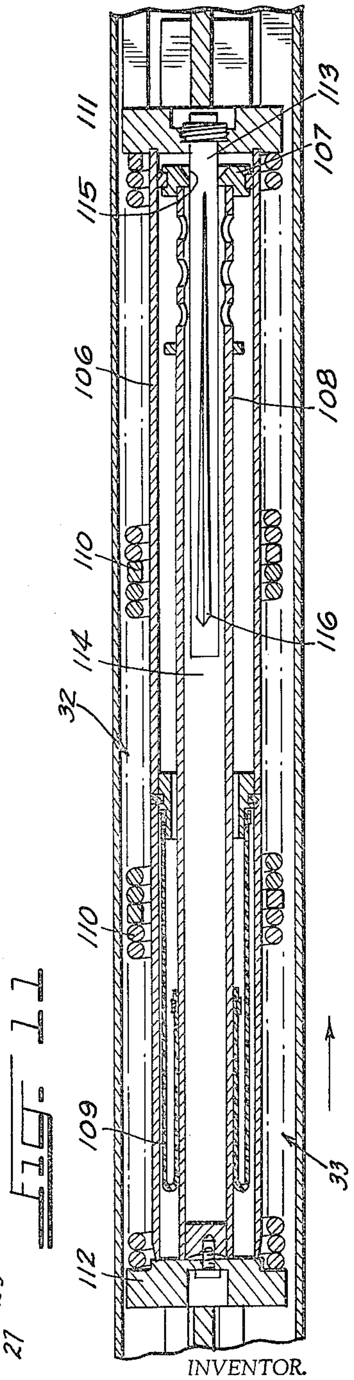
FIG. 11 is a cross-sectional view taken substantially along the lines 11—11 of FIG. 16D.

The cushioning device 204 may be of identical struc- ture and function as that shown and described in connec- ion with FIG. 11. The cushioning means is disposed in the pocket 205, such that in its fully expanded position or neutral position of the sill sections 201 and 202, the follower plates 231 and 232 are in abutting engagement with keys 222–222A and 223–223A, respectively.

The above-described structure functions similarly to the structure of the embodiment of FIGS. 1–19. Upon application of a buff force at the left, the sill section 201 moves in the direction of the force toward the sill sec- tion 202 which is held substantially stationary by the line of cars attached thereto. Assuming the spacing be- tween the sill ends in the neutral position is about 10 inches and the travel of the stress-relieving cushion is about 2 inches, the buffer plates 214 fixed to the yokes 209 are spaced so that their inboard edges are about 8 inches from the follower plate 218, and upon 8 inches of movement of the sill sections the inboard edges abut the follower plate 218 and compress the stress-relieving cushion for its full length of travel before the sill ends abut. At the same time, the sill keys 222 are operative to contract the lading cushioning device against the sta- tionary sill lugs 223A. In this manner, both the stress- relieving cushion device 203 and the lading cushion de- vice 204 are employed to absorb a portion of the energy of impact and thereby reduce the energy transmitted through the length of the sill 200. Upon movement in unison of the sill sections 201 and 202, the sill keys 222 are operative to compress the lading cushion 204 for the remainder of its travel so as to absorb more energy and to transmit only such quantities of energy to the car body and the lading carried thereon so as to prevent damage thereto.

Upon application of a buff force to the right sill section 202, the operation is similar with the exception that the right section 202 is movable and the left sill section 201 remains stationary, such that the buffer plate 214 carried by the section 202 is movable and compresses the cushion 203 which is carried in the sill section 201. At the same time, the sill keys 223 carried by the sill section 202 com- press the lading cushion 204 against the stationary sill keys 222A. Movement in unison of the sill sections 201 and 202 relative to the stationary center sill 206 causes the lading cushion device to be compressed for its full length of travel between the stationary sill keys 222A and sliding sill keys 223.

Upon application of a draft force at either end, the sill section subjected to the draft force moves relatively to the other section such that the bight plates 212 are opera- tive to compress the stress relieving cushion as described heretofore in connection with the embodiment of FIGS. 1–19. Movement of the sill sections in unison causes the lading cushioning means, which is substantially unaffected during relative movement of the sill sections resulting from a draft force, to be retracted or compressed for its full length of travel.

What is claimed is:

1. A railway car comprising an underframe, a sliding sill, means mounting said sliding sill for lengthwise move- ment on said underframe, said sliding sill including a pair of lengthwise spaced sill sections movable relatively to each other from a spaced neutral position to an extended position and a contracted position and movable conjointly relative to said underframe when in said extended and contracted positions, couplers carried on the remote ends of said sliding sill sections, a resilient stress relieving cushion means having a predetermined travel mounted on one of said sections, means fixed to the other of said sill sections for movement therewith and engaging said resilient stress relieving cushion means for connecting said sill sections and for rendering said resilient stress relieving cushion means operative upon buff and draft impact at said couplers thereby causing said sill sections to move to said contracted and extended positions re- spectively and relieving the stresses through the length of said sliding sill, a long travel lading protection cushion device having a travel in excess of the travel of said stress relieving cushioning means and said distance of move- ment of said sliding sill sections from said neutral position to said extended or contracted positions, said long travel cushion device being interposed for interaction between said sliding sill and said underframe and being operative during said conjoint movement of said sill sections, and means on said sill sections causing said long travel lading protection cushion device to be actuated during movement of said sill sections relatively to each other from said neutral to said contracted position, and said resilient stress relieving cushion means being actuated solely during movement of said sill sections from said neutral to said extended position.

2. The invention as defined in claim 1, wherein said means engaging said resilient cushion means comprises a yoke having means for compressing said resilient cushion means upon draft impact and means for compressing said cushion means upon buff impact.

3. The invention as defined in claim 2 wherein said buff impact compression means is located so as to be operative before said sill sections are in said contracted position and during the movement of said long travel cushioning means.

4. The invention as defined in claim 3 wherein said long travel cushioning means is disposed in one said sill sections, and wherein first key means are fixed to said one of said sill means engageable with one end of said long travel cushioning means and second key means are fixed for movement with the other of said sill sections engageable with the other end of said long travel cushioning means, said first and second key means coacting with lengthwise spaced stop means fixed to said underframe for contracting said long travel cushioning means during the full length of travel thereof.

References Cited by the Examiner

UNITED STATES PATENTS

| | | | |
|---|---|---|---|
| 1,997,170 | 4/1935 | Egen | 213—8 |
| 3,003,436 | 10/1961 | Peterson | 213—8 |

MILTON BUCHLER, *Primary Examiner.*

ARTHUR L. LA POINT, *Examiner.*

D. E. HOFFMAN, *Assistant Examiner.*